J. P. TARBOX.
BALANCING MECHANISM.
APPLICATION FILED MAY 16, 1912.

1,239,635.

Patented Sept. 11, 1917.
5 SHEETS—SHEET 1.

Fig. 6. Plan.

WITNESSES

INVENTOR

UNITED STATES PATENT OFFICE.

JOHN P. TARBOX, OF BUFFALO, NEW YORK, ASSIGNOR TO TARBOX SAFETY AIRCRAFT COMPANY, A CORPORATION OF DELAWARE.

BALANCING MECHANISM.

1,239,635. Specification of Letters Patent. Patented Sept. 11, 1917.

Application filed May 16, 1912. Serial No. 697,782.

*To all whom it may concern:*

Be it known that I, JOHN P. TARBOX, a citizen of the United States, residing at Buffalo, New York, have invented certain new and useful Improvements in Balancing Mechanism, of which the following is a specification, reference being had therein to the accompanying drawing.

The invention consists of balancing devices controlled through the relative movements of an inherently stable flying device and the air craft governed by said balancing devices. The inherently stable flying device is constituted a standard of position, and by virtue of the movements of the air craft on which it is mounted with respect to it, the ailerons or other balancing devices are directly or indirectly controlled.

The inherently stable flying device may be any such device now known or which may become known to the art. In the accompanying drawings illustrating my invention I show several forms of these inherently stable flying devices, one of them being the commonly known kite flown from the air craft by means of a string, another of them being a kite flown from a pivoted pole, the kite being connected to the pole by any means permitting a universal movement, still another form being a kite pivotally connected to a pivoted pole for movement about the pole in one plane only, and yet another a form of vane similar in many respects to the commonly known flag and mounted similarly to the kites. So also any dynamically buoyant devices may be used, the number of arrangements with different kites, vanes, and planes being very great as respects their use and arrangement in accordance with my invention.

Referring to the accompanying drawings.

Fig. 3 is a front elevation, Fig. 4 is a top plan view.

Fig. 7, Figs. 8 and 9, and Figs. 10, 11 and 12 are views of different forms of inherently stable flying devices constituting standards of position.

Figure 1:
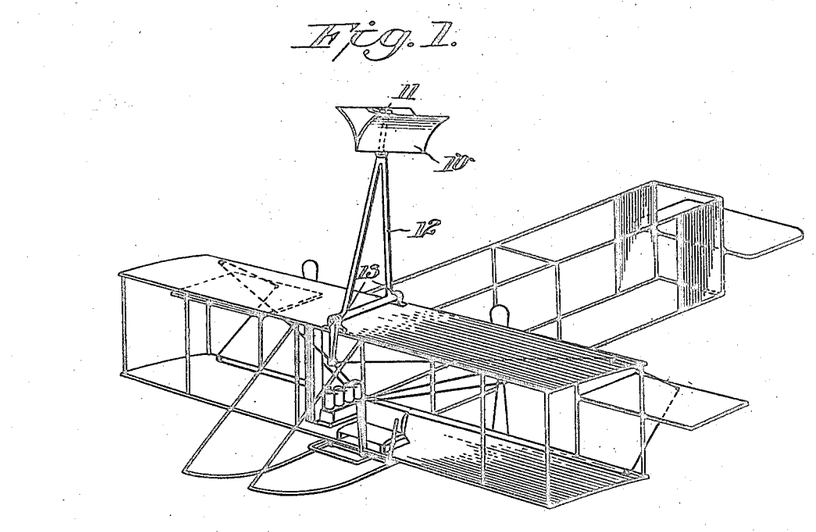
Figure 1 shows one of the standards of position mounted on an aeroplane for the direct control of balancing devices.

Referring to the drawings and first to Fig. 1, a kite 10 is shown as pivotally mounted on an oblique axis 11 fixed to the upper end of pole or bracket 12 pivotally connected at 13 to an aeroplane. The pole pivot 12 extends in the direction of movement of the aeroplane in this instance, with the result that the pole may be moved about the pivotal axis 13 in a plane at right angles to the direction of movement or flight. The axis 11 is inclined rearwardly and lies in a plane common to the pivotal axis 13. The angle of obliquity of the axis 11 as respects the vertical, is equal to the normal flying angle of the kite 10 journaled thereon, and the kite 10 therefore can move about the axis 11 in a plane perpendicular to the axis and at an acute angle to the pivotal axis 13 in case the axis 13 is horizontal or in any other position except normal to the axis 11. The point of the pivotal connection of the kite 10 on the axis 11 may be any point in advance of the center of gravity or pressure of the kite or any other point of connection from which the kite will be inherently stable. A kite so mounted will fly normally in a plane at all times vertical to the surface of the earth, in the same manner as does a kite mounted at the end of a string as is usual, the movement of the kite about the axis 11 upon unbalancing, effecting the balance or return to vertical of the kite in the same manner as does movement of a kite about the point of connection to a string. Thus whenever the pole or bracket 12 departs from a vertical plane, the kite 10 exerts a positive force tending to restore it to the vertical, and in practice it is found that at all points away from normal position, the pole 12 is moved toward the normal upright vertical position by this same positive force.

The balancing devices are connected to the pole 12 as clearly shown, with the result that when the aircraft becomes unbalanced, the balancing devices are moved in a direction to correct the unbalancing by virtue of the relative movement with respect to the normally vertical standard of position, 10, 11, 12, 13.

Figure 2:
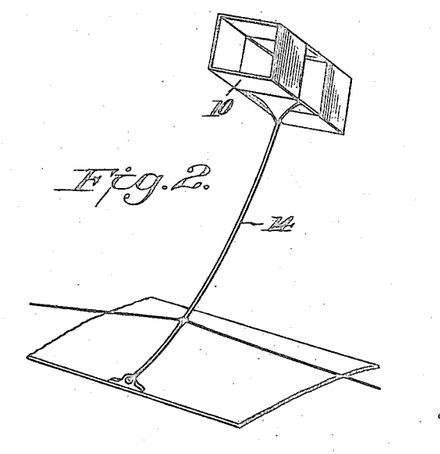
Fig. 2 is a similar view of an ordinary kite flown by a string and directly controlling the balancing devices.

In Fig. 2 the kite 10 instead of being mounted as in Fig. 1, is simply flown from the aircraft by means of a string 14, the balancing devices being connected with the string as shown. Relative movement of the aircraft and string, which string as aforesaid occupies normally a vertical plane, will operate the balancing devices. The form of Fig. 1 is more advantageous than this form because of the fact that the kite 10 is positively supported from the stiff pole 12, this means of support being both convenient and mechanically better adapted for practical use.

Figure 3:
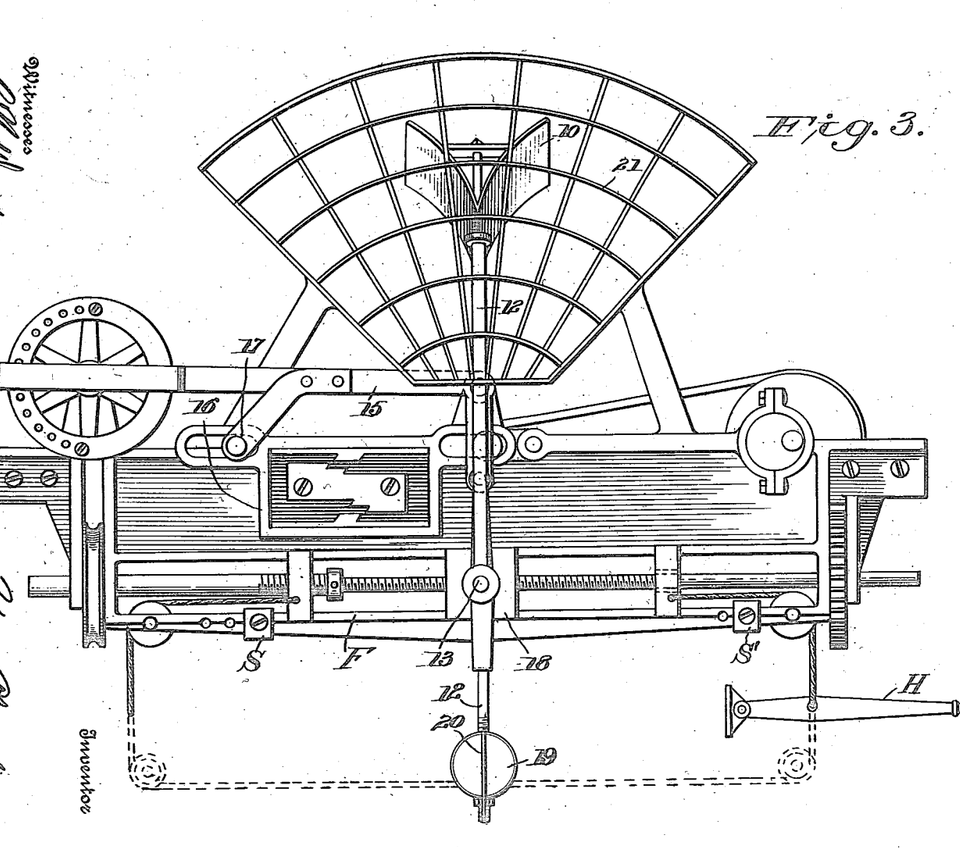
Figure 4:
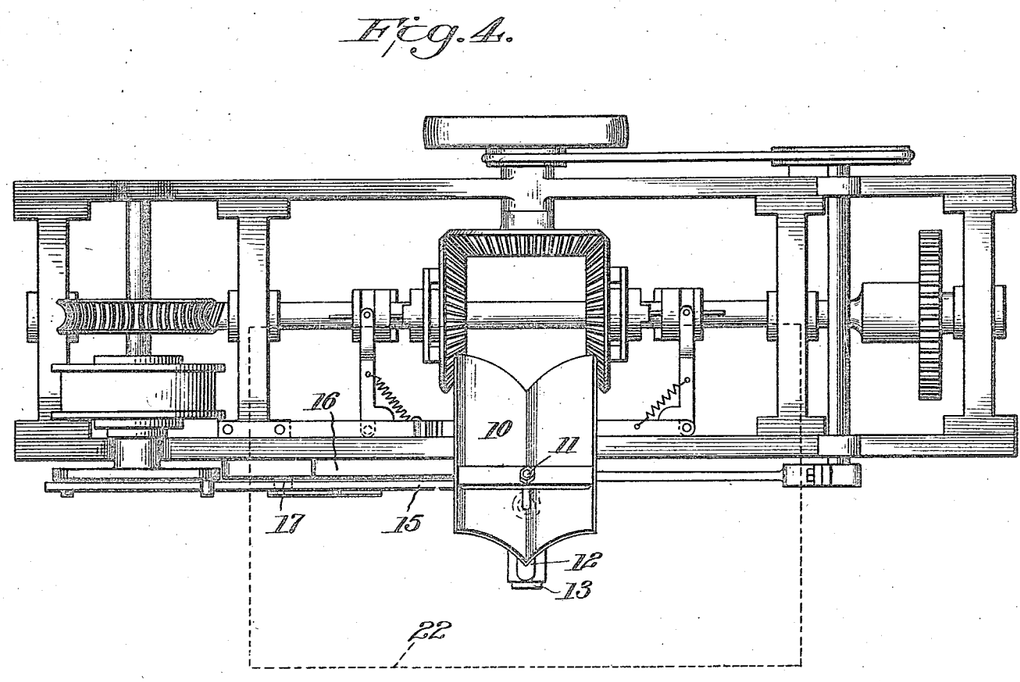
Figure 5:
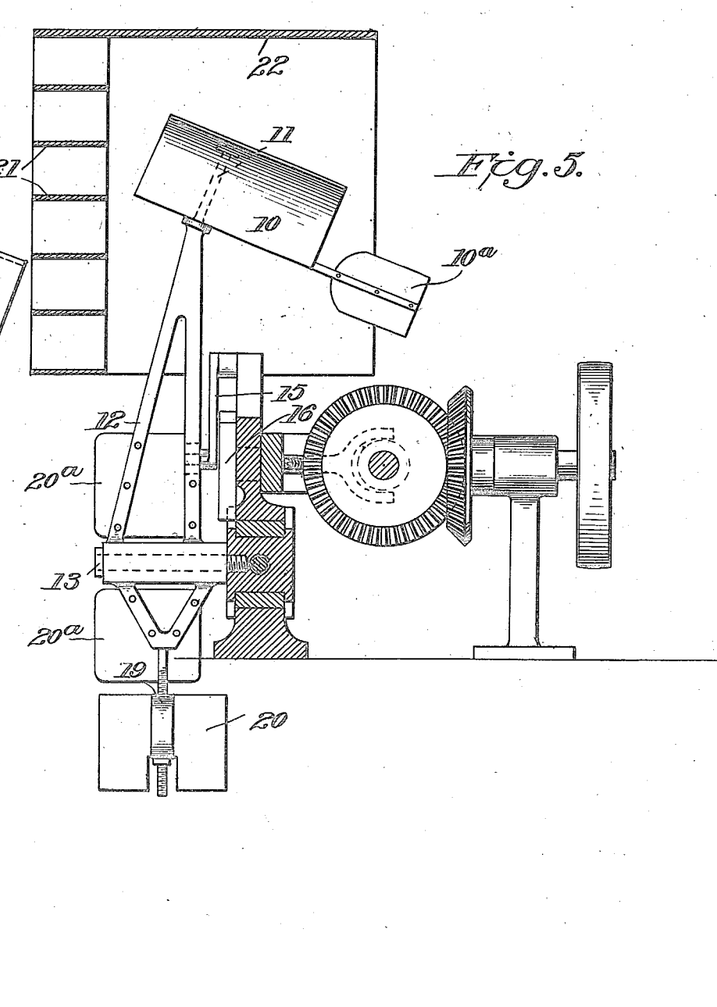
Fig. 5 is a central transverse section, of an automatic balancing mechanism, the standard of position of which is constituted by an inherently stable flying device.

In Figs. 3, 4 and 5 this standard of position of Fig. 1 is shown in combination with an automatic balancing mechanism, the inherently stable flying device being used in place of a pendulum for the control of motor means for operating the balancing devices. Thus the kite 10 may be made quite small. The kite shown is made up of two surfaces the planes of which form a dihedral angle with each other. The motor part of the mechanism in combination with which it is used, is essentially the same as that described in my Patent No. 1,180,274, granted April 18, 1916. The bracket or pole 12 connects with the bell crank lever 15 which connects with the relay frame 16 by a pin and slot connection 17 in the same manner as does the rod of the pendular standard of position shown in the application referred to, while the pivotal axis 13 of the pole 12 is connected to a sliding block 18. Relative movement of the air craft and the standard of position 10, 11, 12, 13, causes an operation of the mechanism and aileron or other balancing devices in the same manner as described in connection with the balancing mechanism of Patent No. 1,180,274.

The pole 12 is extended below the axis 13 and on the lower end thereof is provided the counter balancing weight 19 of such proportions as to counteract the effect of centrifugal force on the masses of pole 12 and connected parts above the axis 13. This weight 19 may have a mass sufficient to counteract the effect of centrifugal force on all of the masses above the axis 13, or may be made on the other hand of such mass as to counteract the centrifugal force on all the masses above the axis 13 excepting the mass of the kite 10 and parts moving therewith. The latter proportion is preferred since the kite 10 by virtue of its movement about its axis 11, itself in part or in whole counteracts the effect of centrifugal force upon it. In any case the mass 19 is adjusted up and down the lower end of the pole 12 to such a point as will insure the retention of the standard of position in its normal vertical plane despite the action of centrifugal force when an air craft is going around a curve. So also the adjustment may be made to secure equal moments of inertia on opposite sides of the axis 13 with the result that the normal position of the standard is not affected by rocking, pitching or speed changes of the air craft.

Mounted on the lower end of the pole 12 with the weight 19 is a vane 20 in a plane parallel to the axis 13 or approximately so. This vane is made of an area sufficient to counteract the deflecting effect of wind at an angle to the axis thereto on the upper part of the pole 12 and the kite 10. This surface 20 may be moved up and down the rod 12 to secure adjustments as is the case with the weight 19. Thus the deflecting effect of side winds on the standard of position is eliminated or minimized.

In order to avoid side winds on the kite, use may also be made of a honeycomb structure such as the group of directing vanes or slats 21 mounted in front of the kite 10 and occupying planes parallel to the axis 13. The outer slats 21 are of considerable extent and constitute a casing 22 completely inclosing the kite 10 whereby only the wind which passes between the slats 21 can reach the kite 10. This wind is given by the slats a direction parallel to axis 13 and thus the normal position of the pole 12 is maintained despite the shifting of the direction of the wind with respect to air craft.

Figures 7, 9, 10, 11, 12:
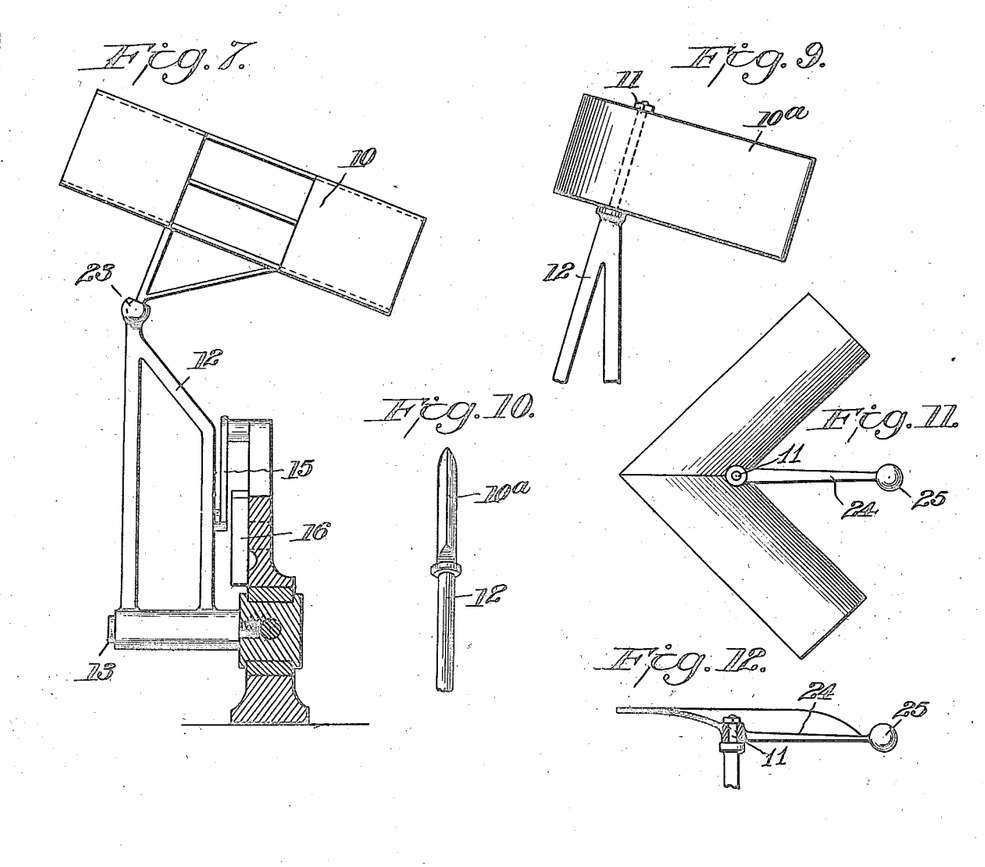

In Fig. 7 is shown a standard of position comprising a kite 10 connected with pole 12 by means of the universal joint 23 instead of by an axis 11. The balancing action of the kite therefore takes place through movement of the joint 23. The pole 12 is shown as connected to the lever 15 operating the relay power shifting device 16 as shown in Fig. 3 et seq.

Fig. 8 shows still another standard of position in which the kite 10 is rigidly connected to the upper end of the pole 12, but the axis 13 is oblique, being pointed upwardly in the direction of motion of the air craft or the wind.

In Figs. 9 and 10 is shown in side and front elevation respectively a standard of position constituted by an approximately plane surface 10$^a$, mounted on an oblique axis passing in advance of its center of gravity in the same manner as the kites previously described are mounted. Normally the vane 10$^a$ exerts no upward force on pole 12, since normally no component of its surfaces is without the vertical plane. In this position it flies like the flag. Upon deflection of the pole from normal position, the force of gravity moving the vane 10$^a$ around the axis 11 gives rise to a restoring force exerted by the wind on the side toward which the rear end of the vane has been moved. This torque on the upper end of the pole 12 restores the standard to normal position.

In Figs. 11 and 12 is shown a still further modified form of standard comprising a kite made up of two plane surfaces at a rearwardly extending dihedral angle, the axis 11 being as before in advance of the center of gravity. A tail 24 provided with a weight 25 is connected to the kite 10, whereby its center of gravity may be controlled, and the position of the axis 11 may be made anything desired with respect to the planes of the kite. It is to be noted that the axis 11 is substantially vertical. Movement of the kite about the axis presents one surface at a more effective angle and withdraws the other surface to a less effective angle, whereby the balance of the standard is maintained.

Figure 6:
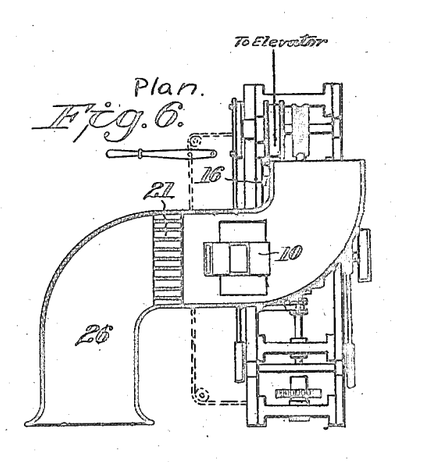
Fig. 6 is a plan view showing the arrangement by which these inherently stable devices may be used for the control of balancing in the direction of flight or in any direction other than that at right angles to the line of flight, as is the direction of the lateral balance.

In Fig. 6 is shown a form of the direction vanes 21 by which the wind is turned through a considerable angle, the vanes mounted within a conduit 26 which turns the wind through quite an angle. Thus those standards of position may be used for the control of fore and aft balancing devices in quite the same manner as they are used to control the lateral balancing devices, all as shown in Fig. 6.

In Fig. 5 I show vanes 20ª above and below the axis 13 and of substantially equal area, for the purpose of damping the movements of the standard. These vanes are in a plane parallel to the axis 13. The vanes may be of unequal area if placed unequal distances away from axis 13. They may or may not be used.

In Fig. 5 is also shown a tail vane 10ª on the kite in a plane parallel to the direction of the air. This steadies the kite 10.

In Fig. 3 are shown two stops S and S' respectively on opposite sides of the frame F connected for manual movement to the hand lever H as in my Patent No. 1,180,274 above referred to. These are positioned to serve a most important function when the balancing mechanism is used for fore and aft control. They limit the departure of the machine from the normal horizontal flying angle by limiting the extent of operation of the automatic mechanism through the hand control. Thus one stop prevents climbing at too great an angle, and thereby accident due to stalling of the craft, while the other prevents gliding downward at too great an angle, thus causing loss of control due to too precipitate descent. By thus steering up and down through the automatic mechanism, misjudgment of gliding and climbing angles is absolutely prevented. Thus is a machine controlled laterally and longitudinally by an automatic balancing mechanism, made absolutely fool-proof in the sense commonly known to engineers.

These stops may also be used when the device is used for lateral balance alone.

While I have described the best forms of my invention now known to me, it is evident that many modifications may be made by those skilled in the art without departing from its generic spirit. In the annexed claims I desire to cover all such modifications. Any desired standard of position may be substituted for that herein disclosed without affecting the operation of the remaining parts of the mechanism.

What I claim is:—

1. In combination, a principal main load supporting but inherently unstable aeroplane structure to be stabilized and an auxiliary but inherently stable aeroplane structure having laterally extending wing surfaces mounted thereon to partake of self imposed stabilizing movements with respect thereto and connected to effect stabilization of said principal aeroplane through exercise thereupon of the inherent stabilizing forces resulting from said movement.

2. In an air craft having balancing devices, a kite flown from the air craft and controlling said balancing devices, said kite comprising a pair of normally active lifting surfaces disposed one on each side of a determinate plane.

3. The combination with an air craft having balancing devices, of a kite controlling said balancing devices and comprising a pair of normally active lifting surfaces disposed one on each side of a determinate plane, and means lying in said plane for connecting said kite to the craft.

4. The combination with an air craft having balancing devices, of a kite controlling said balancing devices and comprising a pair of normally active lifting surfaces forming with each other a dihedral angle, and means attached to the kite at said angle for connecting the kite to the craft.

5. The combination with an air craft having balancing devices, of a kite controlling said balancing devices and comprising a pair of normally active lifting surfaces curved upwardly and away from their point of juncture, and means attached at said point of juncture for connecting the kite to the craft.

6. In a balancing mechanism, a standard of position comprising a normally upright arm pivoted at its lower end, and having a kite connected with its upper end for a balancing movement thereabout, and operating means for balancing devices controlled by said standard.

7. In a balancing mechanism, a standard of position comprising an arm pivotally secured at one end, an axle at the opposite end thereof, a kite mounted on said axle and having a balancing movement thereabout, and operating means for balancing devices controlled by said standard.

8. In a balancing mechanism, a standard of position comprising an arm pivotally secured at one end for movement about a given axis, an axle on its upper end in the plane of said axis and at an angle thereto, a kite mounted on said axle and having a balancing movement thereabout, and operating means for balancing devices controlled by said standard.

9. In a balancing mechanism, a standard of position comprising an arm pivotally secured at its lower end for movement about a given axis, and an axle on its upper end carrying a kite, said axle lying in the plane of said axis and inclined at an angle thereto rearwardly.

10. In a balancing mechanism, a standard of position comprising a member pivotally secured at one end and having a kite connected with its other end for a balancing movement thereabout, means for fixing the direction of the air acting on said kite, and operating means for balancing devices controlled by said standard.

11. In a balancing mechanism, a standard of position comprising a member pivotally secured at one end and having a kite connected with its other end for a balancing movement thereabout, a hood surrounding said kite and having a honeycomb structure in front of the kite for fixing direction of the air acting upon said kite, and operating means for balancing devices controlled by said standard.

12. In a balancing mechanism, a standard of position comprising a member pivotally secured at one end and having a kite connected with its other end for a balancing movement thereabout, said standard occupying a defined normal position in an air current of given normal direction, means counteracting the effect of air currents from directions other than normal, and operating means for balancing devices controlled by said standard.

13. In a balancing mechanism, a standard of position comprising a member pivotally secured at one end and having a kite connected with its other end for balancing movement thereabout, said standard occupying a defined normal position in an air current of given normal direction, and a vane fixedly connected with said member on the opposite side of said pivot from said kite whereby the effect of air currents from directions other than normal is counteracted.

14. In a balancing mechanism, a standard of position comprising a member pivotally secured at one end and having a kite connected with its other end for balancing movement thereabout, means connected with said standard counteracting the disturbing effect of centrifugal force thereon, and operating means for balancing devices controlled by said standard.

15. In a balancing mechanism, a standard of position comprising a member pivotally secured at one end and having a kite connected with its other end for a balancing movement thereabout, means comprising a mass connected with said member on the opposite side of said pivot from said kite for counteracting the disturbing effect of centrifugal force thereon, and operating means for balancing devices controlled by said standard.

16. In a balancing mechanism, a standard of position comprising a member pivotally secured at one end and having a kite connected with its other end for a balancing movement thereabout, said standard occupying a normal position in an air current of given normal direction, means counteracting the effect of air currents from directions other than normal, means connected with said standard counteracting the disturbing effect of centrifugal force thereon and operating means for balancing devices controlled by said standard.

17. In a balancing mechanism, a standard of position comprising a member pivotally secured at one end and having a kite connected with its other end for a balancing movement thereabout, a damping device connected with the said standard for preventing oscillation, and operating means for balancing devices controlled by said standard.

18. In a balancing mechanism, a standard of position comprising a member pivotally secured at one end and having a kite connected with the other end for balancing movement thereabout, a damping device comprising a vane attached to said member on each side of the pivot thereof and lying in the longitudinal vertical plane, and operating means for balancing devices controlled by said standard.

19. A balancing system, comprising an operating means for balancing devices, power transmitting means, a power shifting device controlling the application of power to said operating means, a standard of position controlling said power shifting device, manually operable means for causing at will an operation of said balancing mechanism to change the positional angle of a controlled air craft, and a device limiting the extent of operation of the balancing mechanism through the aforesaid manual control whereby the change of the positional angle of an air craft is automatically limited.

20. A balancing system, comprising an operating means for balancing devices, power transmitting means, a power shifting device controlling the application of power to said operating means, a standard of position controlling said power shifting device, manually operable means for causing at will an operation of said balancing mechanism 21. A balancing system, comprising an operating means for balancing devices, power transmitting means, a power shifting device controlling the application of power to said operating means, and a standard of position controlling said power shifting device and having a defined normal position with respect to the power shifting device, manually operable means for changing the aforesaid defined normal relation, and limit stops connected with one of said standards and power shifting device, whereby the extent of change for said defined normal relative position is limited.

22. An air craft comprising supporting surfaces, and a standard of position carried thereby for controlling the balance thereof and comprising a kite acting by wind pressure to maintain a given position with respect to the vertical.

23. An aircraft comprising supporting surfaces, balancing devices therefor, and a standard of position for controlling automatically the operation of said balancing devices and comprising a kite acting by wind pressure to maintain a given position with respect to the vertical and operatively connected to said balancing devices.

24. The combination with an air craft having balancing means, of an inherently stable kite structure connected to and flown from said craft and constantly acting to seek the vertical during flight, and means controlled by the standard of position thus constituted for operating said balancing means.

25. The combination with an air craft having a main supporting surface, and balancing surfaces at the lateral extremities thereof capable of movement to present different angles of incidence to air pressure, of a kite structure connected to and flown from said craft and constantly acting to seek the vertical during flight, and means controlled by the standard of position thus constituted for operating said balancing surfaces.

26. In a stabilizing device for aeroplanes, an axial rod, a pair of stabilizing wings carried by said rod and rotatable about the axis of the rod, the plane of one wing being disposed in angular relation with the plane of the other wing, said wings being symmetrical with respect to the rod, and the rear edges of said wings being lower than their front edges, and means carried by the axial rod for transmitting the movement of the wings to the ailerons for operating the latter.

27. In a stabilizing device for aeroplanes, an axial rod, a pair of stabilizing wings carried by said rod and rotatable about the axis of the rod, the plane of one wing being disposed in angular relation with the plane of the other wing, said wings being symmetrical with respect to the rod, and the rear edges of said wings being lower than their front edges, means carried by the axial rod for transmitting the movement of the wings to the ailerons for operating the latter, and a protecting shield disposed above said wings, said shield extending in a direction parallel to the line of flight, and being open at its front and rear ends.

28. In a stabilizing device for aeroplanes, an axial rod, a pair of stabilizing wings carried by said rod and rotatable about the axis of the rod, the plane of one wing being disposed in angular relation with the plane of the other wing, said wings being symmetrical with respect to the rod and the rear edges of said wings being lower than their front edges, means carried by the axial rod for transmitting the movement of the wings to the ailerons for operating the latter, a protecting shield disposed above said wings, said shield extending in a direction parallel to the line of flight and being open at its front and rear ends, the lower edge of the shield being below the lower edges of the wings, and means carried by the shield for breaking up cross currents of air entering the shield.

29. In a stabilizing device for aeroplanes, an axial rod, a pair of stabilizing wings carried by said rod and rotatable about the axis of the rod, the plane of one wing being disposed in angular relation with the plane of the other wing, said wings being symmetrical with respect to the rod and the rear edges of said wings being lower than their front edges, means carried by the axial rod for transmitting the movement of the wings to the ailerons for operating the latter, a protecting shield disposed above said wings, said shield extending in a direction parallel to the line of flight and being open at its front and rear ends, the lower edge of the shield being below the lower edges of the wings, and means carried by the shield for breaking up cross currents of air entering the shield, said last named means comprising a plurality of partitions extending parallel to the line of flight, certain of said partitions being disposed in angular relation with the other partitions, thereby providing a plurality of passages for the air.

30. In combination a principal main load supporting but inherently unstable aeroplane structure to be stabilized, and an auxiliary but inherently stable aeroplane structure having laterally extending wing surfaces mounted thereon, balancing rudder surfaces connected with said principal aeroplane, and connections between said auxiliary aeroplane and said balancing rudders to effect stabilization of said principal aeroplane through movement of said balancing rudders brought about by the stabilizing movement of said auxiliary aeroplane.

31. In combination a principal main load supporting but inherently unstable aeroplane structure to be stabilized and an auxiliary but inherently stable aeroplane structure having laterally extending wing surfaces mounted thereon, a servo-motor, the operations of which are controlled through the stabilizing movements of said auxiliary aeroplane, and balancing rudders for said principal aeroplane connected with said servo-motor for operation thereby.

32. In combination, a principal main load supporting but inherently unstable aeroplane structure to be stabilized and an auxiliary but inherently stable aeroplane structure having laterally extending lifting wing surfaces mounted thereon to partake of self imposed stabilizing movements with respect thereto connected to effect stabilization of said principal aeroplane through exercise thereupon of the inherent stabilizing forces resulting from said movements.

In testimony whereof I affix my signature in presence of two witnesses.

JOHN P. TARBOX.

Witnesses:
  H. F. LOWENSTEIN,
  JAMES H. MARR.